(12) United States Patent
Reinhard (10) Patent No.: US 10,193,115 B2
(45) Date of Patent: Jan. 29, 2019

(54) BATTERY COVER

(71) Applicant: East Penn Manufacturing Co., Lyon Station, PA (US)

(72) Inventor: Chris Reinhard, Fleetwood, PA (US)

(73) Assignee: East Penn Manufacturing Co., Lyon Station, PA (US)

( * ) Notice: Subject to any disclaimer, the term of this patent is extended or adjusted under 35 U.S.C. 154(b) by 0 days.

(21) Appl. No.: 15/078,627

(22) Filed: Mar. 23, 2016

(65) Prior Publication Data

US 2017/0279099 A1 Sep. 28, 2017

(51) Int. Cl.
| | |
|---|---|
| *H01M 2/12* | (2006.01) |
| *H01M 2/04* | (2006.01) |
| *H01M 10/12* | (2006.01) |
| *H01M 2/10* | (2006.01) |
| H01M 2/02 | (2006.01) |
| H01M 10/06 | (2006.01) |

(52) U.S. Cl.
CPC ......... *H01M 2/1247* (2013.01); *H01M 2/043* (2013.01); *H01M 2/0473* (2013.01); *H01M 2/1077* (2013.01); *H01M 2/1252* (2013.01); *H01M 10/12* (2013.01); H01M 2/0242 (2013.01); H01M 2/0439 (2013.01); H01M 10/06 (2013.01); H01M 2220/20 (2013.01)

(58) Field of Classification Search
None
See application file for complete search history.

(56) References Cited

U.S. PATENT DOCUMENTS

| | | |
|---|---|---|
| 4,348,466 A | 9/1982 | Elehew et al. |
| 4,600,664 A | 7/1986 | Cramer et al. |
| 4,613,550 A | 9/1986 | Jergl et al. |
| 5,380,604 A * | 1/1995 | Hampe ................. H01M 2/043 |
| | | 429/84 |
| 5,424,146 A | 6/1995 | Lin |
| 5,683,830 A * | 11/1997 | Fritts ................... H01M 2/1252 |
| | | 429/175 |
| 5,691,076 A | 11/1997 | Poe |
| 5,731,100 A | 3/1998 | Fritts et al. |
| 5,843,593 A | 12/1998 | Fritts et al. |
| 6,045,940 A | 4/2000 | Feres |

(Continued)

FOREIGN PATENT DOCUMENTS

| | | |
|---|---|---|
| DE | 102 57 918 A1 | 6/2003 |
| DE | 10257917 A1 | 7/2003 |

(Continued)

OTHER PUBLICATIONS

Abstract of DE 102 57 918, dated Jun. 26, 2003, 2 pages.

(Continued)

*Primary Examiner* — Carmen V Lyles-Irving
(74) *Attorney, Agent, or Firm* — Barley Snyder (57) ABSTRACT

A battery cover is disclosed. The battery cover has a lower battery cover and an upper battery cover. The upper battery cover is matable with the lower battery cover to form a labyrinth and a plurality of battery cover sides. The labyrinth has a plurality of labyrinth cell passageways between a plurality of cell openings and a plurality of mixing areas, and the labyrinth cell passageways extend above an acid level when tipped all directions onto the battery cover sides from an upright orientation.

22 Claims, 9 Drawing Sheets (56) References Cited

U.S. PATENT DOCUMENTS

| | | | |
|---|---|---|---|
| RE37,901 E | 11/2002 | Fritts et al. | |
| 6,660,426 B2 | 12/2003 | Hampe et al. | |
| 6,890,681 B2 | 5/2005 | Mittal et al. | |
| 7,097,935 B2 | 8/2006 | Schellenberg et al. | |
| 7,736,798 B2 | 6/2010 | Fossati et al. | |
| 7,851,082 B2 | 12/2010 | Gelbke et al. | |
| 8,236,437 B2 | 8/2012 | Kim et al. | |
| 8,652,669 B2 | 2/2014 | Nakayama et al. | |
| 2003/0017381 A1 | 1/2003 | Mittal et al. | |
| 2003/0059669 A1 | 3/2003 | Mittal et al. | |
| 2014/0147733 A1 | 5/2014 | Kim et al. | |

FOREIGN PATENT DOCUMENTS

| | | | |
|---|---|---|---|
| EP | 1589596 A2 | 10/2005 | |
| EP | 2597699 A1 | 5/2013 | |
| WO | 2012165760 A2 | 12/2012 | |

OTHER PUBLICATIONS

Abstract of WO 2012/165760, dated Dec. 6, 2012, 2 pages.
European search report, dated Aug. 8, 2017, 14 pages.
Abstract of DE 10257917, dated Jul. 24, 2003, 2 pages.

\* cited by examiner

BATTERY COVER

FIELD OF THE INVENTION

The present invention relates to a battery cover for a lead-acid battery, and more particularly, to a battery cover forming a labyrinth constraining acid that may enter the cover.

BACKGROUND OF THE INVENTION

Lead-acid batteries are commonly used in applications, such as in an automotive battery, in which adverse circumstances may result in the battery tipping from an intended orientation. Leakage of the battery in a tipped position can result in substantial damage including destruction of the battery itself, and consequently, acid constraining covers for lead-acid batteries are known in the art. Many covers comprise a lower and upper section that combine to form an enclosed area in communication with the acid inside the battery. When the battery is tipped ninety degrees onto a side, the acid flows into the enclosed area formed by the lower and upper sections, providing additional protection from the acid fully exiting the battery and cover assembly.

U.S. Pat. No. 5,843,593 issued to Fritts et al. (hereinafter "Fritts") discloses such a combination of an intermediate cover 14 and an outer cover 16 attached to a lead-acid battery housing 12. The combination of the intermediate cover 14 and outer cover 16 creates a network of labyrinths 20 between cell vents 22 communicating with the acid inside the battery and an atmospheric vent 38 communicating with the exterior of the battery and cover assembly. Each cell vent 22 in the cover corresponds to a cell of the battery. The labyrinth of Fritts constrains acid exiting the battery cells through the cell vents 22 in multiple tipped orientations. The shape of the labyrinth in Fritts, however, permits acid from multiple cells to mix within the cover in certain orientations, such as when the battery is tipped ninety degrees onto side 168 shown in FIG. 11; the acid from three cells has mixed in passage 130b. When the acid from multiple cells connects, an electrical short is formed between the cells, reducing the cell voltage and the life of the battery.

SUMMARY OF THE INVENTION

An object of the invention, among others, is to provide a battery cover that prevents the mixing of acid from multiple cells when the battery is tipped onto any side. The disclosed battery cover has a lower battery cover and an upper battery cover. The upper battery cover is matable with the lower battery cover to form a labyrinth and a plurality of battery cover sides. The labyrinth has a plurality of labyrinth cell passageways between a plurality of cell openings and a plurality of mixing areas, and the labyrinth cell passageways extend above an acid level when tipped ninety degrees onto the battery cover sides from an upright orientation.

BRIEF DESCRIPTION OF THE DRAWINGS

The invention will now be described by way of example with reference to the accompanying figures, of which.

DETAILED DESCRIPTION OF EMBODIMENTS OF THE INVENTION

The invention is explained in greater detail below with reference to embodiments of a battery assembly and battery cover. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
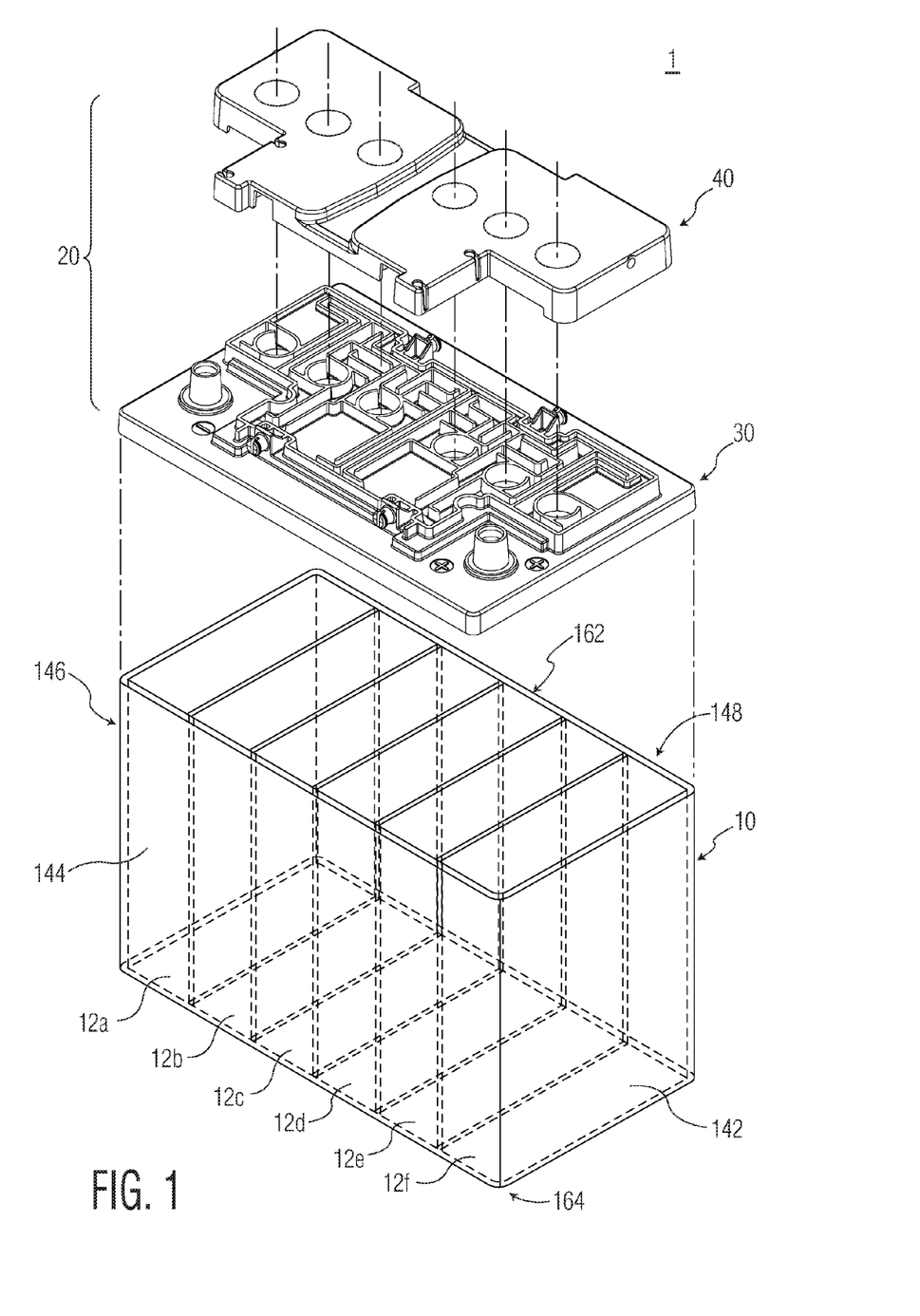
FIG. 1 is an exploded perspective view of a battery assembly according to the invention.

A battery assembly 1 according to the invention is generally shown in FIG. 1. The battery assembly 1 includes a battery housing 10 and a battery cover 20. The battery cover 20 includes a lower battery cover 30 and an upper battery cover 40. The major components of the invention will now be described in greater detail.

The battery housing 10 is schematically shown in FIG. 1 as a cube in an upright orientation and has four sides 142, 144, 146, and 148 along with a top 162 and a bottom 164. The battery housing 10 contains the battery acid during normal operation of the battery assembly 1 in a plurality of cells 12a-f. The cells 12a-f are isolated from one another within the battery housing 10. One with ordinary skill in the art would understand that the number of cells 12a-f shown in FIG. 1 is merely exemplary, and that varying numbers of cells could be used in a variety of applications.

The battery cover 20 includes lower battery cover 30 and upper battery cover 40.

Figure 3:
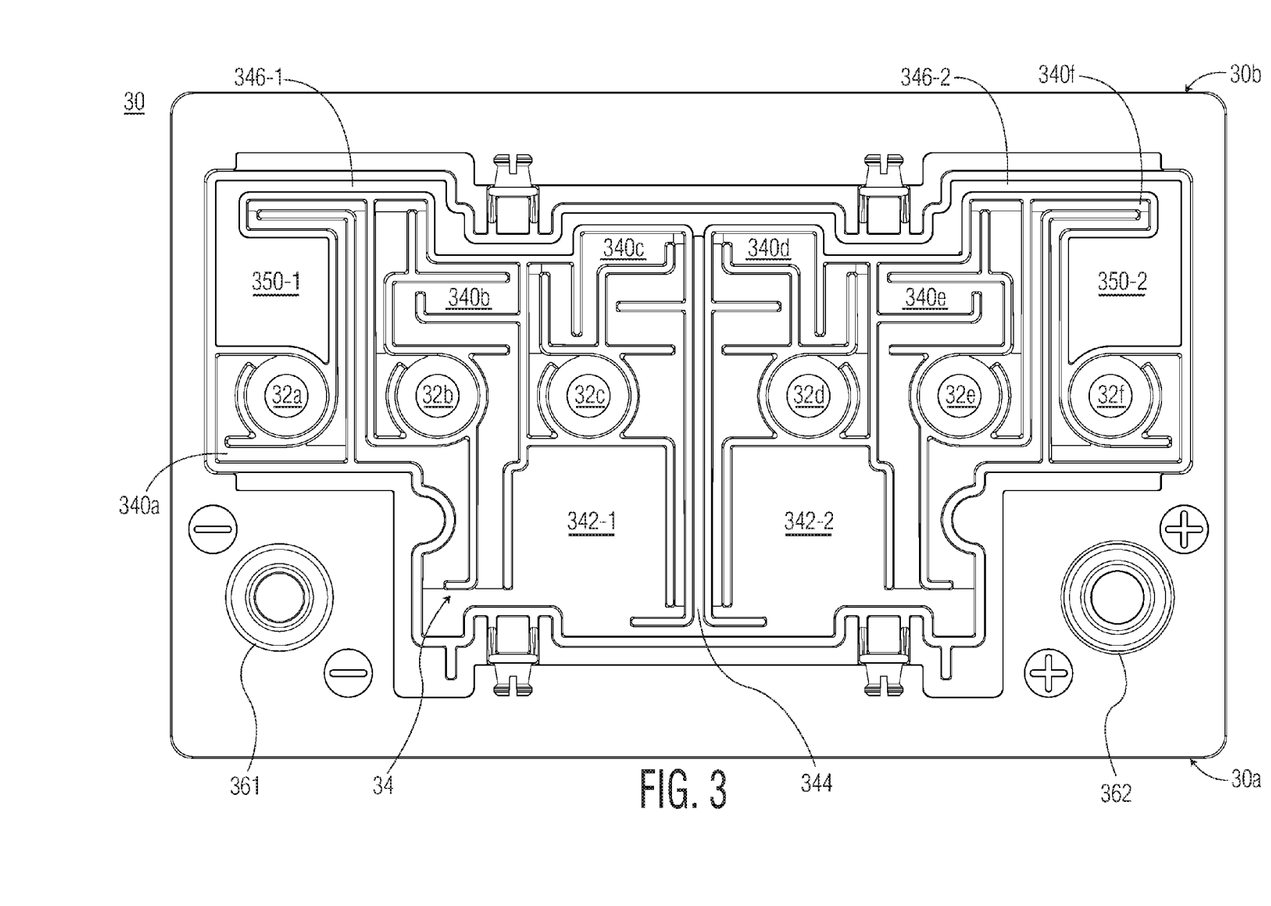
FIG. 3 is a top view of a lower battery cover of the battery assembly.

Lower battery cover 30 is shown in FIG. 3 with a terminal side 30a and an opposite side 30b. The lower battery cover 30 includes cell openings 32, lower labyrinth passageways 34, lower exhaust areas 350, and terminals 361, 362. Each of these elements will now be described in greater detail.

Figure 2:
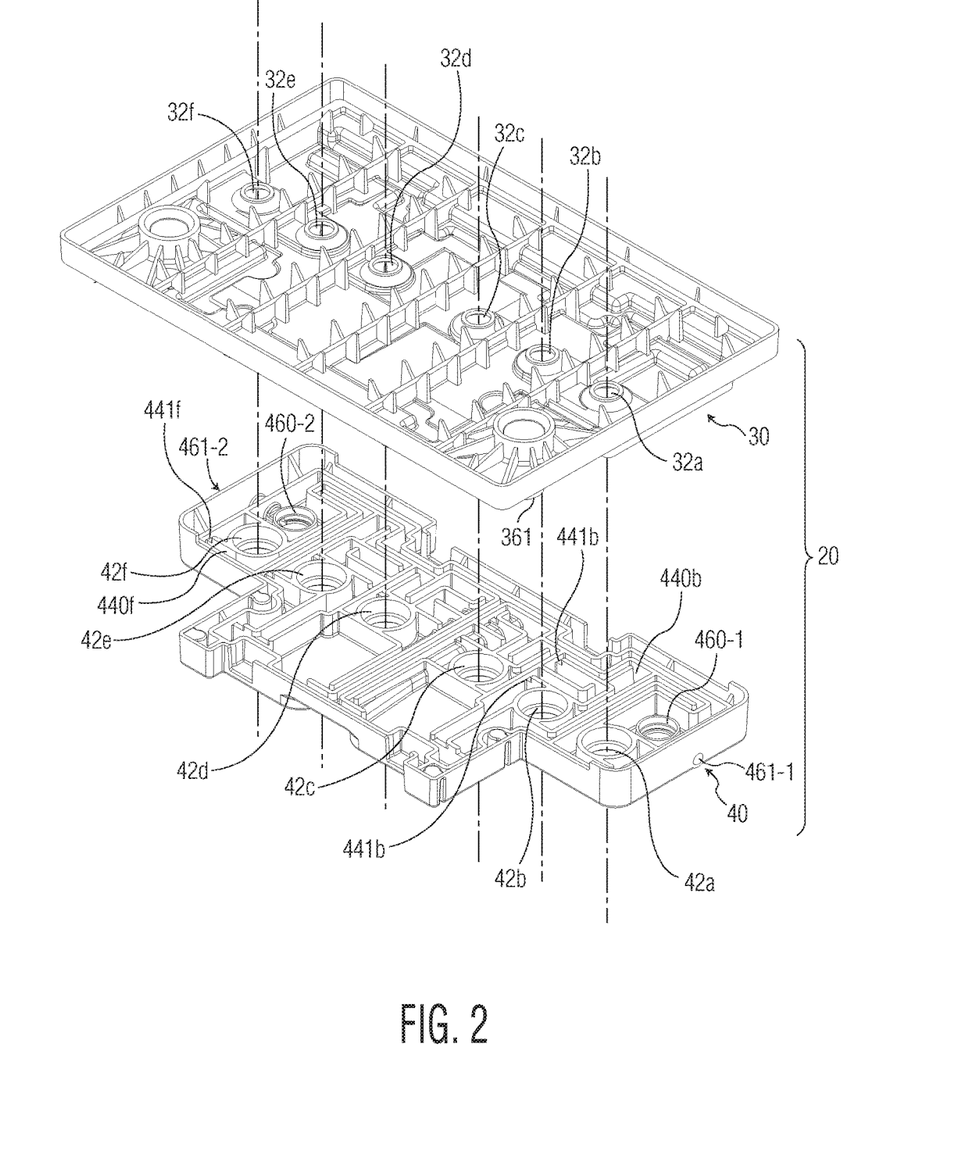
FIG. 2 is an exploded perspective view of a battery cover of the battery assembly.

Cell openings 32 are positioned approximately centrally within the lower battery cover 30 and extend through the lower battery cover 30, as best shown in FIGS. 2 and 3. The lower battery cover 30 has one cell opening 32a-f for each cell 12a-f of the battery assembly 1.

Lower labyrinth passageways 34 include walls that extend vertically from the lower battery cover 30 to form communication channels. The lower labyrinth passageways 34 communicate with the cell openings 32 and include lower labyrinth cell passageways 340a-f, lower mixing areas 342-1, 342-2, lower central channel 344, and lower exhaust passageways 346-1, 346-2. The lower labyrinth passageways 34 are sloped, with the lower end of the slope positioned to communicate with the cell opening 32.

Lower labyrinth cell passageways 340a-f each correspond to a cell opening 32a-f. The lower labyrinth cell passageways 340a-f extend from the respective cell openings 32a-f in variously shaped passageways shown in FIG. 3, each lower labyrinth cell passageway 340a-f first extending toward the opposite side 30b of the lower battery cover 30 before leading to the terminal side 30a.

Lower labyrinth cell passageways 340a-c terminate in a first lower mixing area 342-1, and lower labyrinth cell passageways 340d-f terminate in a second lower mixing area 342-2. Each of the first and second lower mixing areas 342-1 and 342-2 are approximately square areas constrained by the lower labyrinth passageways 34. The first and second lower mixing areas 342-1 and 342-2 are positioned on the terminal side 30a, and also communicate with the lower central channel 344. The lower central channel 344 splits into a first lower exhaust passageway 346-1 and a second lower exhaust passageway 346-2. Each of the first and second lower exhaust passageways 346-1 and 346-2 communicate, respectively, with lower exhaust areas 350-1 and 350-2. The lower exhaust areas 350-1 and 350-2 are approximately square areas constrained by the lower labyrinth passageways 34, and are positioned near opposite corners of the lower battery cover 30 on opposite side 30b.

Negative terminal 361 and positive terminal 362 are positioned on opposite ends of the terminal side 30a of the lower battery cover 30, outside of the lower labyrinth passageways 34 as shown in FIG. 3. In the embodiment shown in FIG. 1, negative terminal 361 and positive terminal 362 are cylindrical members extending vertically from the lower battery cover 30, but one with ordinary skill in the art would understand that the terminals 361, 362 could be a variety of known structural elements provided they afford electrical connection to the battery assembly 1.

Figure 4:
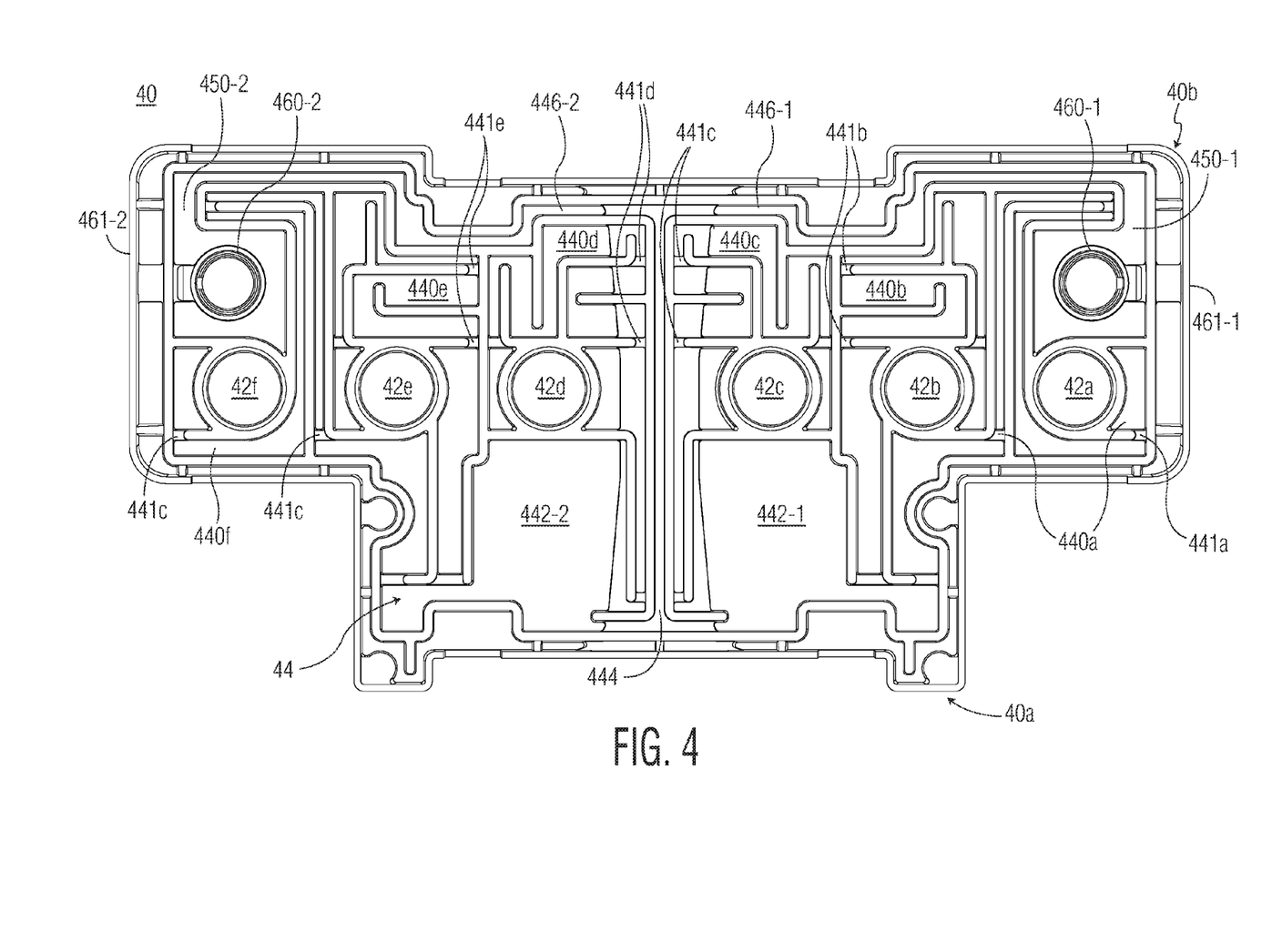
FIG. 4 is a bottom view of an upper battery cover of the battery assembly.

Upper battery cover 40 is shown in FIG. 4 with a terminal side 40a and an opposite side 40b. Upper battery cover 40 includes sealed upper ports 42, upper labyrinth passageways 44, upper exhaust areas 450, and exterior vents 460. Each of these elements will now be described in greater detail.

Sealed upper ports 42 are positioned approximately centrally within the upper battery cover 40, as best shown in FIGS. 2 and 4. The upper battery cover 40 has one sealed upper port 42a-f for each cell 12a-f of the battery assembly 1.

Upper labyrinth passageways 44 include walls that extend vertically from the upper battery cover 40 to form communication channels. The upper labyrinth passageways 44 communicate with the sealed upper ports 42 and include upper labyrinth cell passageways 440a-f, upper labyrinth passageway barriers 441a-f, upper mixing areas 442-1, 442-2, upper central channel 444, and upper exhaust passageways 446-1, 446-2.

Upper labyrinth cell passageways 440a-f each correspond to a sealed upper port 42a-f. The upper labyrinth cell passageways 440a-f extend from the respective sealed upper ports 42a-f in variously shaped passageways shown in FIG. 4, each upper labyrinth cell passageway 440a-f first extending toward the opposite side 40b of the upper battery cover 40 before leading to the terminal side 40a. Each upper labyrinth cell passageway 440a-f is interrupted by a plurality of upper labyrinth passageway barriers 441a-f, respectively; exemplary upper labyrinth passageway barriers 441b for upper labyrinth cell passageway 440b, and upper labyrinth passageway barriers 441f for upper labyrinth cell passageway 440f, are shown in FIGS. 2 and 4. The upper labyrinth cell passageway barriers 441a-f lessen the cross-sectional area of the upper labyrinth cell passageways 440a-f at various positions shown in FIG. 4.

Upper labyrinth cell passageways 440a-c terminate in a first upper mixing area 442-1, and upper labyrinth cell passageways 440d-f terminate in a second upper mixing area 442-2. Each of the first and second upper mixing areas 442-1 and 442-2 are approximately square areas constrained by the upper labyrinth passageways 44. The first and second upper mixing areas 442-1 and 442-2 are positioned on the terminal side 40a, and also communicate with the upper central channel 444. The upper central channel 444 splits into a first upper exhaust passageway 446-1 and a second upper exhaust passageway 446-2. Each of the first and second upper exhaust passageways 446-1 and 446-2 communicate, respectively, with upper exhaust areas 450-1 and 450-2.

The upper exhaust areas 450-1 and 450-2 are approximately square areas constrained by the upper labyrinth passageways 44, and are positioned near opposite corners of the upper battery cover 40 on opposite side 40b. The upper exhaust areas 450-1 and 450-2 respectively contain first exterior vent 460-1 and second exterior vent 460-2. First and second exterior vents 460-1, 460-2 may be cylindrical elements positioned approximately centrally in the upper exhaust areas 450-1 and 450-2, and are in communication with the exhaust areas 450-1 and 450-2. One with ordinary skill in the art would understand that the first and second exterior vents 460-1 and 460-2 could be a variety of known shapes that permit communication. The first and second exterior vents 460-1, 460-2 respectively include first and second vent outlets 461-1 and 461-2 communicating with an area exterior of the upper battery cover 40.

The connections forming the battery assembly 1 shown in FIG. 1 will now be described.

Lower battery cover 30 is attached to upper battery cover 40 to assemble battery cover 20. As shown in FIGS. 1 and 2, the lower battery cover 30 and upper battery cover 40 are aligned at their respective terminal ends 30a, 40a, and opposite ends 30b, 40b. The upper battery cover 40 is placed on top of the lower battery cover 30 in this alignment, and the upper battery cover 40 is secured and sealed to the lower battery cover 30. The lower battery cover 30 and upper battery cover 40 may be attached to each other and sealed via mechanical elements, heat sealing, gluing, or other means of attachment known to those with ordinary skill in the art.

The mating of the lower battery cover 30 and upper battery cover 40 aligns to create an enclosed labyrinth 24 between the lower battery cover 30 and upper battery cover 40 within the assembled battery cover 20 having sides 251-254. The labyrinth 24 is a series of enclosed passageways leading from the plurality of cell openings 32a-f to the first and second vent outlets 461-1 and 461-2. The elements of the battery cover 20 and labyrinth 24 will be described with reference to FIG. 5. For the purposes of illustration, the view shown in FIG. 5 only depicts the lower battery cover 30, but the elements will be described with respect to the fully aligned battery cover 20 with labyrinth 24.

As shown in FIGS. 1 and 2, the cell openings 32a-f align with sealed upper ports 42a-f, respectively. The lower labyrinth passageways 34 align with upper labyrinth passageways 44 to create labyrinth passageways 24 of the battery cover 20. The numbering of the upper and lower cover elements shown in FIGS. 3 and 4 is based on the alignment of individual elements within the battery cover 20; lower labyrinth cell passageway 340a aligns with upper labyrinth cell passageway 440a to create labyrinth cell passageway 240a, and similarly for labyrinth cell passageways 240b-f. First lower mixing area 342-1 aligns with first upper mixing area 442-1 to create first mixing area 242-1, lower channel 344 aligns with upper channel 444 to form channel 244, first lower exhaust passageway 346-1 aligns with first upper exhaust passageway 446-1 to form first exhaust passageway 246-1, first lower exhaust area 350-1 aligns with first upper exhaust area 450-1 to form first exhaust area 250-1, and similarly for the other numbered elements.

The assembled battery cover 20 is positioned such that the cell openings 32a-f align with the respective cells 12a-f of the battery housing. The battery cover 20 is attached to and seals the top of the battery housing 10 via a connection between the lower battery cover 30 and the battery housing 10. The lower battery cover 30 may be attached to the battery housing 10 via heat sealing, gluing, or other means of attachment known to those with ordinary skill in the art The battery assembly 1, and particularly the battery cover 20, provides additional protection from acid leakage when the battery assembly 1 is tipped ninety degrees from the upright orientation shown in FIG. 1. When the battery assembly 1 is tipped, acid exits the cells 12a-f through the respective cell openings 32a-f and enters the labyrinth 24 of the battery cover 20. The constraining of the acid within the battery cover 20 when the battery assembly 1 is tipped ninety degrees onto sides 142, 144, 146 or 148 will be described in detail with reference to FIGS. 5-9.

Figure 5:
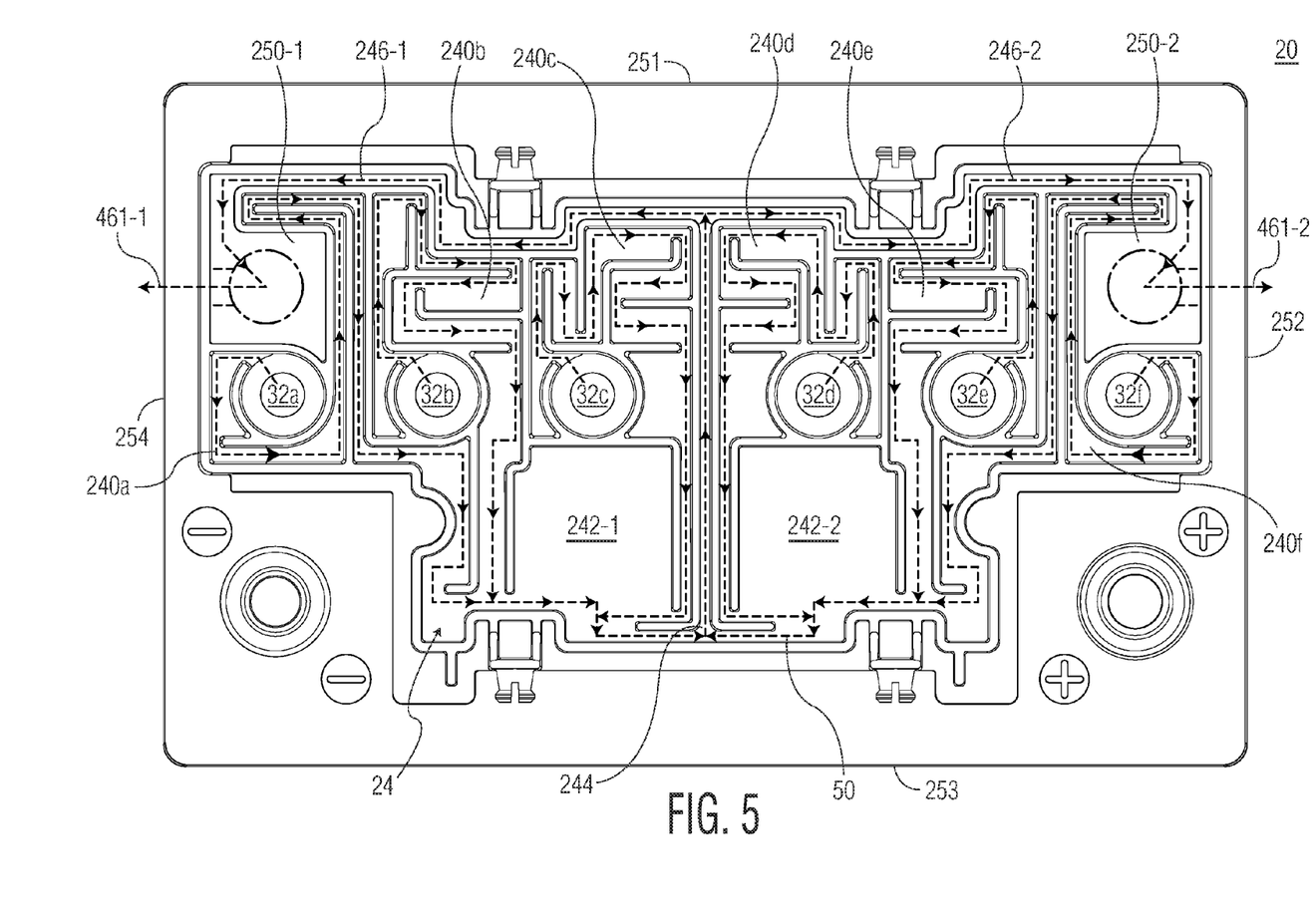
FIG. 5 is sectional top view of the battery cover.

FIG. 5 shows the general path 50 of acid exiting the battery housing 10 within the battery cover 20. As similarly described above, for the purposes of illustration the view shown in FIG. 5 only depicts the path 50 through the lower battery cover 30, but the path 50 will be described with respect to the fully aligned battery cover 20 with labyrinth 24.

The acid or gas path 50 begins when exiting cells 12a-f through the cell openings 32a-f; the acid or gas collects in the area created by the cell openings 32a-f and sealed upper ports 42a-f, and when the quantity exceeds the available area, the acid or gas exits into the labyrinth cell passageways 240a-f. Within the labyrinth cell passageways 240a-f, the upper labyrinth passageway barriers 441a-f decrease the cross-sectional area in certain locations and may impede the flow of acid along the path 50. The path 50 along labyrinth cell passageways 240a-c meets in first mixing area 242-1, and the path 50 along labyrinth cell passageways 240d-f meets in second mixing area 242-2. Gas exiting cell openings 32a-f can first mix in either first or second mixing area 242-1, 242-2. As will be described below, when the battery assembly 1 is tipped ninety degrees onto any side, only gas may mix in first or second mixing area 242-1, 242-2, as the acid will not reach this area of the battery cover 20.

Gas from the first and second mixing areas 242-1 and 242-2 may progress along the path 50 to further mix in channel 244. The path 50 then splits into first and second exhaust passageways 246-1 and 246-2, which lead to first and second exhaust areas 250-1 and 250-2. The gas may finally exit the battery cover 20 at first and second vent outlets 461-1 and 461-2.

FIGS. 6-9 depict the level of acid in the battery cover 20 when the battery assembly 1 is tipped ninety degrees onto various sides; the acid level is dictated by the level of the acid in the cells 12a-f, and is potentially further limited by an airlock created by acid blocking the airflow between cells 12a-f and vent outlets 461-1 and 461-2. Each of the described Figures only shows the acid level in half of the battery cover 20 for ease of understanding. Since labyrinth cell passageways 240a-c are mirrored versions of labyrinth cell passageways 240d-f, the acid level in the half of the battery cover 20 not shown in FIGS. 6-9 is simply a mirrored version of the depicted half.

Figure 6:
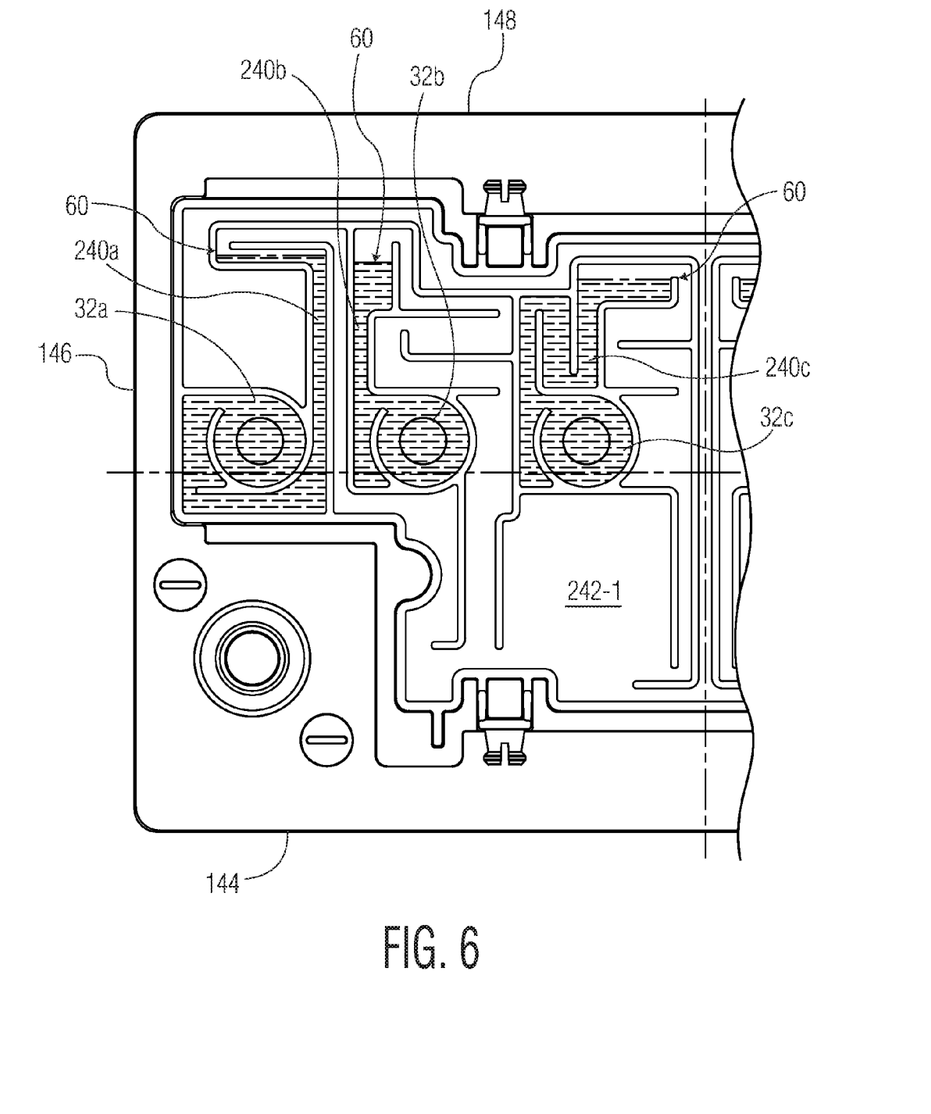
FIG. 6 is a partial sectional view depicting the acid level in the battery cover when the battery assembly is tipped ninety degrees onto a first side.

FIG. 6 shows the acid level 60 in the battery cover 20 when the battery assembly 1 is tipped ninety degrees onto side 144. The acid exits the depicted cell openings 32a-c and partially fills the respective labyrinth cell passageways 240a-c. As shown in FIG. 6, portions of each labyrinth cell passageway 240a-c extend above the acid level 60 when the battery assembly 1 is on side 144. In this orientation, acid exiting through each individual cell opening 32a-c does not progress to the first mixing area 242-1 or otherwise mix, thereby preventing an electrical connection between any of cells 12a-f.

Figure 7:
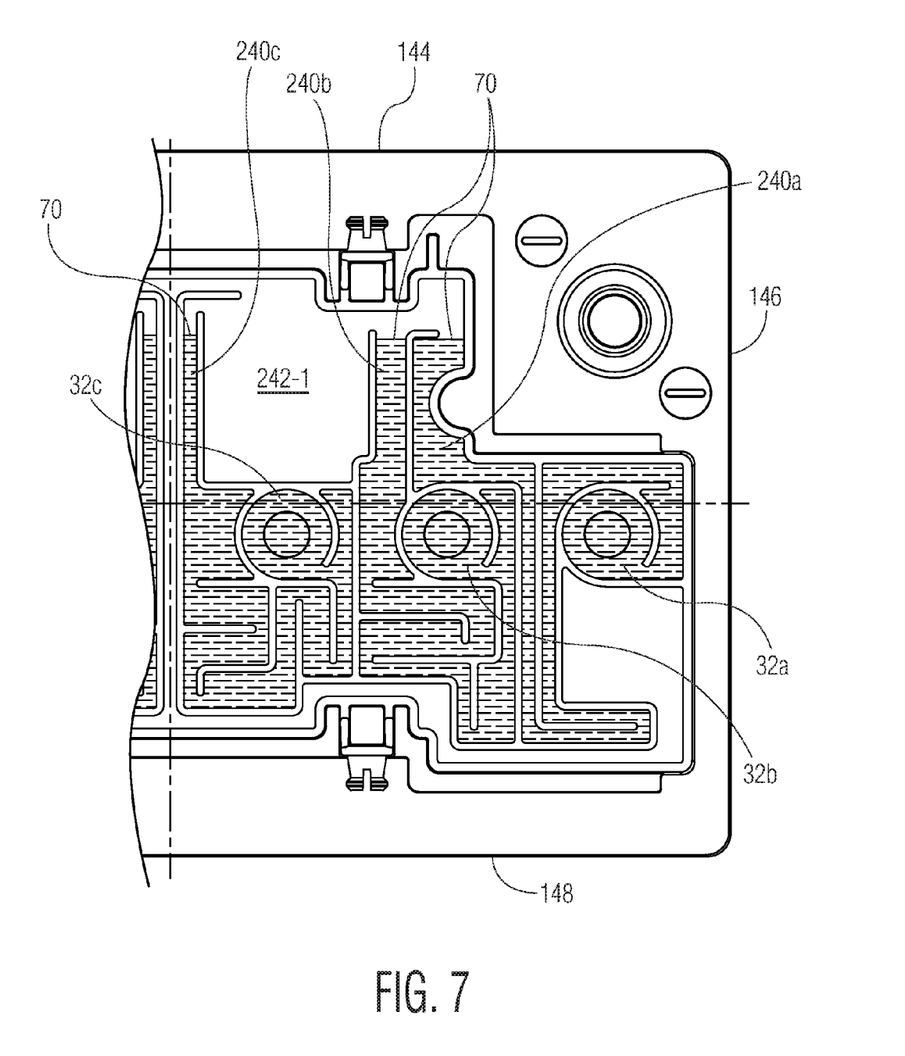
FIG. 7 is a partial sectional view depicting the acid level in the battery cover when the battery assembly is tipped ninety degrees onto a second side.

FIG. 7 shows the acid level 70 in the battery cover 20 when the battery assembly 1 is tipped ninety degrees onto side 148. The acid exits the depicted cell openings 32a-c and partially fills the respective labyrinth cell passageways 240a-c. As shown in FIG. 7, portions of each labyrinth cell passageway 240a-c extend above the acid level 70 when the battery assembly 1 is on side 148. In this orientation, acid exiting through each individual cell opening 32a-c does not progress to the first mixing area 242-1 or otherwise mix, thereby preventing an electrical connection between any of cells 12a-f.

Figure 8:
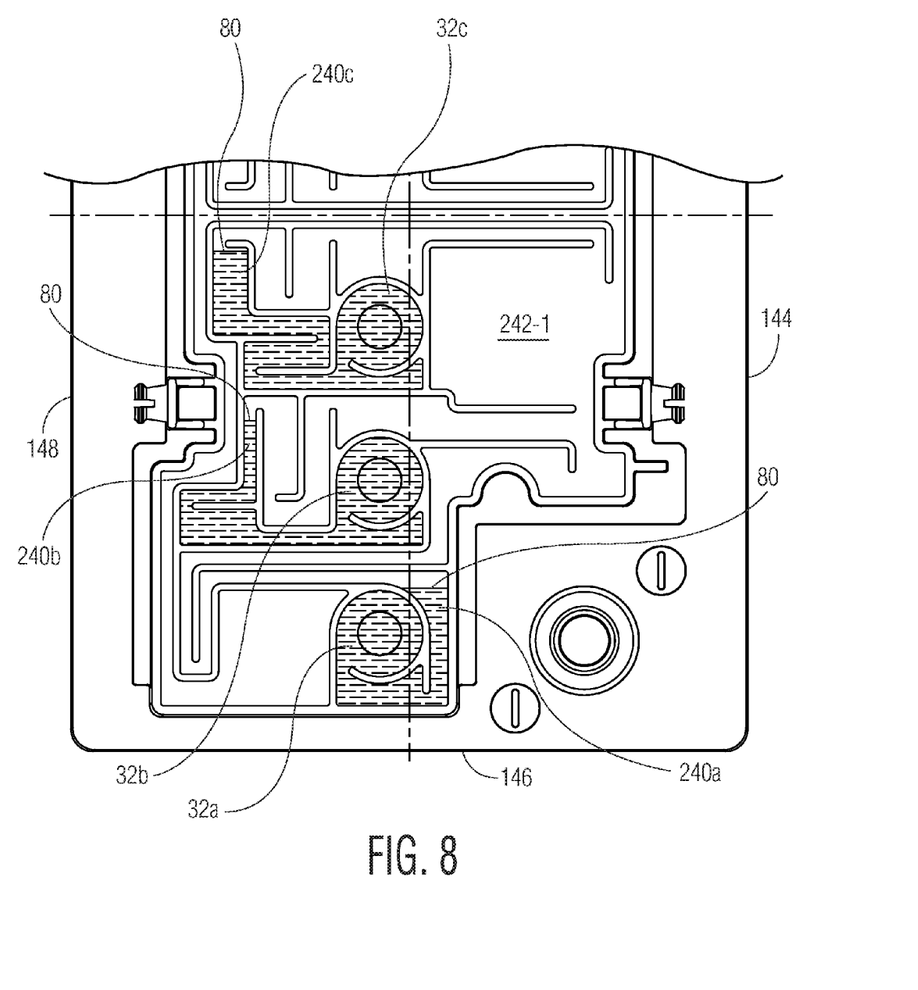
FIG. 8 is a partial sectional view depicting the acid level in the battery cover when the battery assembly is tipped ninety degrees onto a third side.

FIG. 8 shows the acid level 80 in the battery cover 20 when the battery assembly 1 is tipped ninety degrees onto side 146. The acid exits the depicted cell openings 32a-c and partially fills the respective labyrinth cell passageways 240a-c. As shown in FIG. 8, portions of each labyrinth cell passageway 240a-c extend above the acid level 80 when the battery assembly 1 is on side 146. In this orientation, acid exiting through each individual cell opening 32a-c does not progress to the first mixing area 242-1 or otherwise mix, thereby preventing an electrical connection between any of cells 12a-f.

Figure 9:
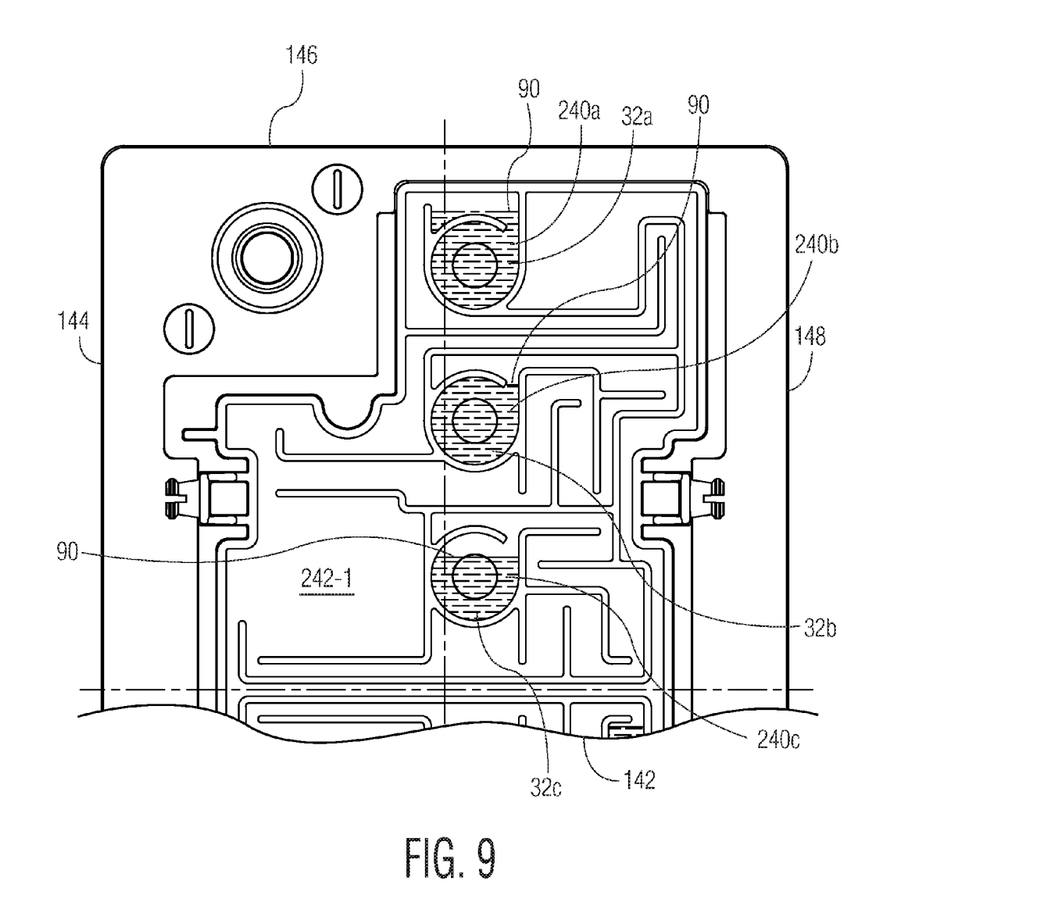
FIG. 9 is a partial sectional view depicting the acid level in the battery cover when the battery assembly is tipped ninety degrees onto a fourth side.

FIG. 9 shows the acid level 90 in the battery cover 20 when the battery assembly 1 is tipped ninety degrees onto side 142. The acid exits the depicted cell openings 32a-c and partially fills the respective labyrinth cell passageways 240a-c. As shown in FIG. 9, portions of each labyrinth cell passageway 240a-c extend above the acid level 90 when the battery assembly 1 is on side 142. In this orientation, acid exiting through each individual cell opening 32a-c does not progress to the first mixing area 242-1 or otherwise mix, thereby preventing an electrical connection between any of cells 12a-f.

If the battery assembly 1 tipped ninety degrees onto any of sides 142-148 is returned to an upright orientation shown in FIG. 1, the acid contained within the labyrinth cell passageways 240a-f will follow the slope of the lower labyrinth passageways 34 and return to the corresponding cell 12a-f via the cell openings 32a-f.

Advantageously, the battery cover 20 of the present invention prevents the mixing of acid from battery cells 12a-f when a battery assembly 1 employing the cover 20 is tipped ninety degrees onto any one of four sides. Maintaining the isolation of acid from individual cells 12a-f within the battery cover 20 prevents harmful spillage of battery acid and prolongs the life of the battery.

What is claimed is:
1. A battery cover, comprising:
   a lower battery cover, and
   an upper battery cover matable with the lower battery cover to form a labyrinth and a plurality of battery cover sides including a terminal side and an opposite side, the labyrinth defined by a plurality of walls formed by the lower battery cover and the upper battery cover and having a plurality of labyrinth cell passageways each extending only between one of a plurality of cell openings and one of a plurality of mixing areas positioned on the terminal side, a plurality of exhaust passageways extending along an entirety of the opposite side of the upper battery cover, and a channel disposed between the plurality of mixing areas and the plurality of exhaust passageways, the channel connecting the plurality of mixing areas to the plurality of exhaust passageways by extending from a lower end of each of the plurality of mixing areas at the terminal side and splitting into the plurality of exhaust passageways, the plurality of labyrinth cell passageways each extending to a position directly adjacent one of the plurality of exhaust passageways at the opposite side before leading to the one of the plurality of mixing areas at the terminal side, each of the plurality of labyrinth cell passageways is separated only by one of the plurality of walls from one of the plurality of exhaust passageways at the position directly adjacent one of the plurality of exhaust passageways.

2. The battery cover of claim 1, wherein each of the plurality of labyrinth cell passageways correspond to one of the plurality of cell openings.

3. The battery cover of claim 2, wherein a labyrinth cell passageway first communicates with another labyrinth cell passageway in one of the plurality of mixing areas.

4. The battery cover of clam 3, wherein the plurality of cell openings are positioned centrally in the battery cover between the terminal side and the opposite side.

5. The battery cover of claim 4, further comprising a pair of terminals positioned on the terminal side.

6. The battery cover of claim 1, wherein the plurality of mixing areas communicate with a plurality of exhaust areas via the channel and the plurality of exhaust passageways.

7. The battery cover of claim 6, wherein each of the plurality of exhaust areas contains an exterior vent.

8. The battery cover of claim 7, wherein the exterior vent communicates with an area exterior of the battery cover.

9. The battery cover of claim 1, wherein the plurality of cell openings, plurality of labyrinth cell passageways, and plurality of mixing areas are disposed in a mirrored structure.

10. The battery cover of claim 1, wherein the upper battery cover is attached and sealed to the lower battery cover by at least one of heat sealing and gluing.

11. The battery cover of claim 1, wherein the labyrinth cell passageways extend above an acid level when tipped ninety degrees in all directions onto the battery cover sides from an upright orientation.

12. The battery cover of claim 1, wherein a plurality of lower labyrinth passageways are a portion of the labyrinth disposed in the lower battery cover.

13. The battery cover of claim 12, wherein each of the lower labyrinth passageways has a slope with a lower end of the slope positioned at one of the plurality of cell openings.

14. The battery cover of claim 1, wherein a plurality of upper labyrinth cell passageways are a portion of the plurality of labyrinth cell passageways disposed in the upper battery cover.

15. The battery cover of claim 14, wherein each of the upper labyrinth cell passageways has an upper labyrinth passageway barrier at which the upper labyrinth cell passageway has a reduced cross-sectional area.

16. The battery cover of claim 1, wherein each of the plurality of labyrinth cell passageways has at least eight ninety degree turns between one of the plurality of cell openings and one of the plurality of mixing areas.

17. A battery assembly, comprising:

a battery housing having a top, a plurality of sides, and a plurality of cells containing acid; and a battery cover attached to the top of the battery housing having a lower battery cover, and an upper battery cover matable with the lower battery cover to form a labyrinth and a plurality of battery cover sides including a terminal side and an opposite side, the labyrinth defined by a plurality of walls formed by the lower battery cover and the upper battery cover and having a plurality of labyrinth cell passageways each extending only between one of a plurality of cell openings and one of a plurality of mixing areas positioned on the terminal side, a plurality of exhaust passageways extending along an entirety of the opposite side of the upper battery cover, and a channel disposed between the plurality of mixing areas and the plurality of exhaust passageways, the channel connecting the plurality of mixing areas to the plurality of exhaust passageways by extending from a lower end of each of the plurality of mixing areas at the terminal side and splitting into the plurality of exhaust passageways, the plurality of labyrinth cell passageways each extending to a position directly adjacent one of the plurality of exhaust passageways at the opposite side before leading to the one of the plurality of mixing areas at the terminal side, each of the plurality of labyrinth cell passageways is separated only by one of the plurality of walls from one of the plurality of exhaust passageways at the position directly adjacent one of the plurality of exhaust passageways.

18. The battery assembly of claim 17, wherein the plurality of cells are isolated from one another within the battery housing.

19. The battery assembly of claim 18, wherein each of the plurality of cell openings corresponds to one of the plurality of cells.

20. The battery assembly of claim 19, wherein, when the battery housing is tipped onto one of its sides, acid enters the battery cover through the plurality of cell openings.

21. The battery assembly of claim 20, wherein each of the plurality of labyrinth cell passageways correspond to one of the plurality of cell openings.

22. The battery assembly of claim 21, wherein a labyrinth cell passageway first communicates with another labyrinth cell passageway in one of the plurality of mixing areas.

* * * * *